United States Patent Office 3,541,135
Patented Nov. 17, 1970

3,541,135
LYSINE DERIVATIVES
Albert Jöhl, Basel, Switzerland, Albert Hartmann, Grenzach, Germany, and Hans Rink, Riehen, Switzerland, assignors to Geigy Chemical Corporation, Greenburgh, N.Y., a corporation of Delaware
No Drawing. Filed Feb. 2, 1967, Ser. No. 613,418
Int. Cl. C07c *101/26, 101/24*
U.S. Cl. 260—471                              9 Claims

ABSTRACT OF THE DISCLOSURE

Lysine derivatives of the formula

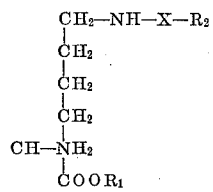

wherein

X represents —CO— or —CO—O— which is linked via its carbon atom to NH, $R_1$ represents a saturated monocyclic hydrocarbon radical having at most 12 carbon atoms, and $R_2$ represents a hydrocarbon radical having at most 12 carbon atoms which, optionally, is substituted by halogen up to the atomic number 35 and/or low alkoxy groups, and which, when X is —CO—O— cannot be an optionally substituted phenyl or naphthyl radical, and their pharmaceutically acceptable salts with acids, which compounds have stimulating action in the metabolism of the connective tissue, as well as antiallergic activity and a promoting action on the healing of wounds, and are useful in the treatment of diseases of the connective tissue and allergies of various origin; therapeutic compositions containing them, and methods of treating inflammatory diseases and allergic conditions with the aid of the aforesaid compounds and compositions.

---

The present invention concerns new aminocarboxylic acid esters and processes for the production thereof, pharmaceutical compositions containing the new compounds, and the use of the aforesaid compounds and compositions in the treatment of allergic conditions and as stimulants for the metabolism of connective tissue in mammals.

Compounds of the general Formula I

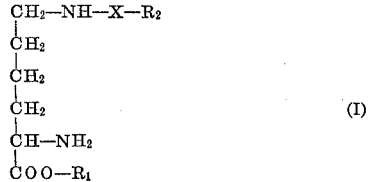                       (I)

wherein

X represents —CO— or —CO—O— the carbon atom of which is linked to NH, $R_1$ represents a saturated monocycloaliphatic hydrocarbon radical having at most 12 carbon atoms and $R_2$ represents a hydrocarbon radical having at most 12 carbon atoms which, optionally, is substituted by halogen up to the atomic number 35 and/or lower alkoxy groups, and which, when X is —CO—O— cannot be an optionally susbtituted phenyl or naphthyl radical, in their DL, D and L forms as well as their addition salts with inorganic or organic acids, have not been known hitherto.

It has now been found that these compounds possess valuable pharmacological properties. They surprisingly possess on oral, rectal, local and parenteral application a stimulating action on the metabolism of the connective tissue, as well as antiallergic atcivity and a promoting action on the healing of wounds. This characterises them as suitable for the treatment of diseases of the connective tissue and allergies of various origin. Their antiallergic action has been demonstrated among other things on the chlorodinitrobenzene-induced eczema.

When X in Formula I is —CO—, $R_2$ represents a preferably saturated open-chain aliphatic or araliphatic, or an aromatic hydrocarbon radical having at most 12 carbon atoms which is unsubstituted or which is substituted by halogen of an atomic number of at most 35 and/or lower alkoxy groups.

When X in Formula I is —CO—O—, said hydrocarbon radical $R_2$ is an open-chain aliphatic radical, a cycloaliphatic radical, or an araliphatic radical the aliphatic moiety of which is preferably open-chained, and more particularly alkyl of at most 12 carbon atoms, phenyl-lower alkyl or naphthyl-lower alkyl, the aromatic nuclei of which are unsubstituted or substituted by halogen and/or alkoxy as defined above.

In the compounds of general Formula I, $R_1$ can represent; e.g. the cyclopropyl, cyclopropylmethyl, cyclopropylethyl, cyclobutyl, cyclobutylmethyl, cyclobutylethyl, cyclopentyl, cyclopentylmethyl, cyclopentylethyl, cyclohexyl, cyclohexylmethyl, cyclohexylethyl, cycloheptyl, cycloheptylmethyl, cyclooctyl, cyclooctylmethyl or cyclooctylbutyl group.

$R_2$ can represent the methyl, ethyl, propyl, isopropyl, butyl, sec. butyl, isobutyl, t.-butyl, pentyl, isopentyl, 1,2-dimethylpropyl group, etc. up to the dodecyl group, phenyl, benzyl, 2-phenethyl or the 1- and 2-naphthyl-methyl or the 1-, 2- or 3-acenaphthyl group; benzene rings of phenyl or benzyl can be substituted in the o-, m- and/or p-position and naphthalene rings in the 1-, 2-, 3-, 4-, 5-, 6-, 7-, or 8-position by bromine, chlorine or fluorine, and/or the trifluoromethyl, methyl, ethyl, methoxy or ethoxy group.

To produce a compound of general Formula I according to the invention, a compound of general Formula II

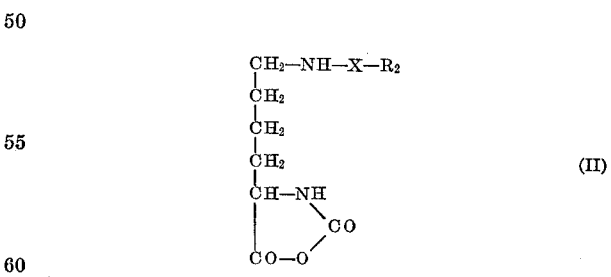                       (II)

wherein X and $R_2$ have the meanings given in Formula I, is reacted with a monocycloaliphatic alcohol of the general Formula III $$R_1—OH \quad \quad \quad (III)$$

wherein $R_1$ has the meaning given in Formula I and, if desired, the ester obtained is converted into an addition salt with an inorganic or organic acid. The reaction is preferably performed with the aid of a strong mineral acid such as hydrochloric acid or concentrated sulphuric acid. As solvent, excess alcohol and/or an inert solvent is used. Suitable inert solvents are, e.g. hydrocarbons such as benzene or toluene, or ethertype liquids such as dioxane or diethyl ether.

Starting materials, i.e. anhydrides, of the general formula II have been described in the literature. They are produced, e.g. by reacting an $N^6$-acyl-$N^2$-benzyloxycarbonyl lysine in diethyl ether with thionyl chloride. Preferably, the reaction mixture is used in the process according to the invention without isolating the anhydride. Examples of such starting materials are compounds of general Formula II wherein the group X is carbonyl or oxycarbonyl (—CO—O—) and the radical $R_2$ represents those groups which are explicitly mentioned therefor at the end of Formula I.

Monocycloaliphatic alcohols of Formula III suitable for reaction with the last-mentioned starting materials of Formula II are, for instance, cyclopropanol, cyclopropyl-methanol, 1- or 2-cyclopropyl-ethanol, 1-, 2-, 3- or 4-cyclopropyl-butanol, cyclobutanol, cyclobutyl-methanol, 1- or 2-cyclobutyl-ethanol, cyclopentanol, cyclopentyl-methanol, 1- or 2-cyclopentyl-ethanol, cyclohexanol, cyclohexyl-methanol, 1- or 2-cyclohexyl-ethanol, cycloheptanol, cycloheptyl-methanol, cyclooctanol, cyclooctyl-methanol, 1- or 2-cyclooctyl-ethanol, 2- or 3-cyclooctyl-propanol, 4-cyclooctyl-butanol, or cyclododecanol.

A compound of general Formula I is produced by a second process according to the invention by transforming an aminocarboxylic acid of the general Formula IV

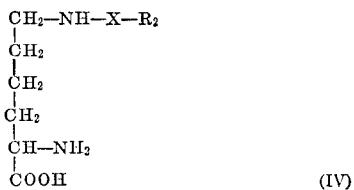

(IV)

wherein X and $R_2$ have the meanings given in Formula I, or a reactive derivative of such an acid, by known methods into a monocycloaliphatic ester and, if desired, converting the ester obtained into an addition salt with an inorganic or organic acid.

For example, an acid of general Formula IV is reacted with a monocycloaliphatic alcohol of the general Formula III wherein $R_1$ has the meaning given in Formula I. This reaction of the free carboxylic acid can be performed, e.g. with the aid of a mineral acid such as hydrochloric acid or concentrated sulphuric acid, an aromatic sulphonic acid such as p-toluene or benzene sulphonic acid, and also with the aid of thionyl chloride or sulphuryl chloride. As solvent, excess alcohol and/or an inert solvent is used. Suitable inert solvents are, e.g. hydrocarbons such as benzene or toluene and also chlorinated hydrocarbons such as chloroform and carbon tetrachloride. If water is split off in the reaction, this is removed preferably by azeotropic distillation.

Instead of a free acid of general Formula IV, also a low ester, such as the methyl or ethyl ester, can be reacted with a monocycloaliphatic alcohol of the general Formula III. This transesterification is preferably performed in excess alcohol in the presence of a catalyst such as sodium methylate or aluminium isopropylate.

Starting materials of general Formula III are the alcohols, the radical $R_1$ of which represents the groups which are explicitly mentioned at the end of Formula I.

In another variation of this process according to the invention, an acid of general Formula IV or a salt of such an acid is reacted with a reactive ester of a monocycloaliphatic alcohol of the general Formula III. Such suitable salts are alkali metal salts such as sodium and potassium salts, or salts of organic bases such as pyridine, triethylamine or dicyclohexylethylamine, and suitable reactive esters of alcohols of general Formula III are halides such as bromides or chlorides, carboxylic acid esters such as acetates, also sulphates, sulphites, benzene or toluene sulphonic acid esters. Halides and sulphates are preferably reacted with the salts mentioned and acetates or sulphites are preferably reacted with the corresponding free acids of general Formula IV. The acetates and sulphites are esterified, e.g. with the aid of benzene or p-toluene sulphonic acid or perchloric acid.

An acid of general Formula IV can also be esterified with a monocycloalkylene or a monocycloalkyl alkylene which is disubstituted at a carbon atom having a double bond. The reaction is performed, e.g. with the aid of a strong mineral acid, e.g. concentrated sulphuric acid, in an inert solvent. Suitable solvents are, e.g. chlorinated hydrocarbons such as methylene chloride, alcohols such as ethylene glycols, ethertype liquids such as dioxane or ethylene glycol dimethyl ether.

Suitable starting materials of the general Formula IV are, e.g. those the radical $R_2$ of which represents the groups explicitly mentioned at the end of Formula I and the group X of which represents the carbonyl or the oxycarbonyl (—CO—O—) radical. Such starting materials, e.g. $N^6$-methoxycarbonyl-lysine or N6-acetyl-lysine have been described in the literature; others can be produced analogously, by refluxing lysine with basic copper carbonate in water and reacting the resulting complex with the corresponding acid chloride or chloroformate in the cold.

Suitable acyl chlorides for use in the preparation of the corresponding starting materials of Formula IV are, e.g., acetyl chloride, propionyl chloride, butyryl chloride, isobutyryl chloride, valeryl chloride, isovaleryl chloride, 2 - methyl - butyryl chloride, pivalyl chloride, caproyl chloride, isocaproyl chloride, 1,2 - dimethyl - butyryl chloride, enanthyl chloride, capryiyl chloride, pelargonyl chloride, capryl chloride, hendecanoyl chloride, lauryl chloride or tridecanoyl chloride, benzoyl chloride, o-, m- or p-toluyl chloride, 3,5-dimethylbenzoyl chloride, o-, m- or p-chlorobenzoyl chloride, o-, m- or p-methoxybenzoyl chloride, o-, m- or p-bromobenzoyl chloride, 2-chloro-4-methyl-benzoyl chloride, o-, m- or p-methoxybenzoyl chloride, o-, m- or p-ethoxy-benzoyl chloride, p-ethyl benzoyl chloride, p-trifluoromethylbenzoyl chloride, phenyl-acetyl chloride, o-, m- or p-chlorophenyl-acetyl chloride, o-, m- or p-bromophenyl-acetyl chloride, o-, m- or p-methoxyphenyl-acetyl chloride, o-, m- or p-ethoxy-phenyl-acetyl chloride, 2-phenyl-propionyl chloride, 2-(p-chlorophenyl)-propionyl chloride, 2 - (p - methoxyphenyl)-propionyl chloride, 1-naphthoyl chloride, 2-naphthoyl chloride, naphthyl-(1-acetyl chloride, naphthyl-(2)-acetyl chloride, 1- 2- or 3-acenaphthyl chloride.

Suitable chloroformates for use in the preparation of starting materials of Formula IV, as described above, are, e.g., the methyl, ethyl, propyl, isopropyl, butyl, sec-butyl, isobutyl, t-butyl, pentyl isopentyl 1,2-dimethylpropyl, hexyl, heptyl, octyl, isooctyl, nonyl, decyl, undecyl, dodecyl, benzyl, o-, m- or p-chloro-benzyl o-, m- or p-bromobenzyl, o-, m- or p-fluoro-benzyl, o-, m- or p-methoxy-benzyl, o-, m- or p-ethoxy-benzyl, 2-phenyl-ethyl, 2-(p-chlorophenyl)-ethyl, p-trifluoromethyl-benzyl-p-methylbenzyl, p-ethyl-benzyl, naphthyl - (1) - methyl, naphthyl - (2) - methyl, 3-chloro-naphthyl - (1) - methyl or 3,5-dichloronaphthyl - (1) - methyl esters of chloroformic acid.

As mentioned above, the new active substances are administered orally, rectally and parenterally. The daily dosages of the free bases or of pharmaceutically acceptable salts thereof vary between 10 and 100 mg. for adult higher mammals. Suitable dosage units such as dragées (sugar coated tablets), tablets, suppositories or ampoules, preferably contain 5–50 mg. of an active substance according to the invention or a pharmaceutically acceptable salt thereof.

Pharmaceutically acceptable salts of the bases according to the invention are salts with those acids the anions of which are tolerated by the mammals treated therewith in the therapeutically effective dosages. In addition, it is of advantage if the salts to be used crystallise well and are not or only slightly hydroscopic. Pharmaceutically acceptable salts are, e.g. the salts with hydrochloric acid, hydrobromic acid, sulphuric acid, phosphoric acid, methane sulphonic acid, ethane sulphonic acid, β-hydroxyethane sulphonic acid, acetic acid, lactic acid, oxalic acid, succinic acid, fumaric acid, maleic acid, malic acid, tartaric acid, citric acid, benzoic acid, salicyclic acid, phenylacetic acid, mandelic acid and embonic acid. These can be used as active substances instead of the free bases.

Dosage units for oral administration preferably contain between 1% and 90% of a compound of general Formula I or a pharmaceutically acceptable salt thereof as active substance. They are produced by combining the active substance, e.g. with solid, pulverulent carriers such as lactose, saccharose, sorbitol, mannitol; starches such as potato starch, maize starch or amylopectin, also laminaria powder or citrus pulp powder; cellulose derivatives or gelatine, optionally with the addition of lubricants such as magnesium or calcium stearate or polyethylene glycols of suitable molecular weights, to form tablets or dragée cores. The latter are coated, e.g. with concentrated sugar solutions which can also contain, e.g. gum arabic, talcum and/or titanium dioxide, or with a lacquer dissolved in easily volatile organic solvents. Dyestuffs can be added to these coatings, e.g. to distinguish between different dosages of active substance.

Examples of dosage units for rectal administration are, e.g. suppositories which consist of a combination of an active substance of a suitable salt thereof with a neutral fatty foundation, or also gelatine rectal capsules which contain a combination of the active substance or a suitable salt thereof with polyethylene glycols of suitable molecular weight.

Ampoules for parenteral, particularly intramuscular, administration preferably contain a water soluble salt of an active substance in a concentration of, preferably, 0.5–5%, in aqueous solution, optionally together with suitable stabilising agents and buffer substance.

The following prescriptions further illustrate the production of tablets and dragées:

(a) 250 g. of $N^6$-benzyloxycarbonyl - L - lysine cycloheptyl ester hydrochloride are mixed with 175.80 g. of lactose and 169.70 g. of potato starch, the mixture is moistened with an alcoholic solution of 10 g. of stearic acid and granulated through a sieve. After drying, 160 g. of potato starch, 200 g. of talcum, 2.50 g. of magnesium stearate and 32 g. of colloidal silicon dioxide are mixed in and the mixture is pressed into 10,000 tablets each weighing 100 mg. and containing 25 mg. of active substance (hydrochloride). If desired, the tablets can be grooved for better adaptation of the dosage.

(b) A granulate is produced from 250 g. of $N^6$-benzyloxy-carbonyl - L - lysine cycloheptyl ester hydrochloride, 175.90 g. of lactose and the alcoholic solution of 10 g. stearic acid. After drying, the granulate is mixed with 56.60 g. of colloidal silicon dioxide, 165 g. of talcum, 20 g. of potato starch and 2.50 g. of magnesium stearate and the mixture is pressed into 10,000 dragée cores. These are coated with a concentrated syrup made from 522.28 g. of crystallised saccharose, 6 g. of shellac, 10 g. of gum arabic, 215 g. of talcum, 15 g. of cooloidal silicon dioxide, 0.22 g. of dyestuff and 1.5 g. of titanium dioxide, and dried. The dragées obtained each weigh 145 mg. and contain 25 mg. of active substance.

The following examples further illustrate the production of the new compounds of general Formula I and of hitherto undescribed intermediate products, but they in no way limit the scope of the invention. The temperatures are given in degrees centigrade.

EXAMPLE 1

(a) 13.8 ml. (192 mM.) of thionyl chloride are added dropwise with stirring to a suspension of 31.0 g. (75 mM.) of $N^2,N^6$-bisbenzyloxcarbonyl-L-lysine in 190 ml. of abs. diethyl ether. During the addition the temperature was maintained at −10°. The reaction mixture is kept for 30 minutes at 20° and then refluxed for 4 hours. The $N^6$-benzyloxycarbonyl-L-lysine-$N^2$-carboxyanhydride crystallises out.

(b) To the suspension of the crude anhydride 100 g. of cycloheptanol are added at 10° within 30 minutes. The temperature of the reaction mixture is then raised to 35°, kept at 35° for 20 minutes and afterwards at 20° for 16 hours. To work up, the clear solution is evaporated to dryness in vacuo at 20°. The remaining oil is dissolved in 500 ml. of diethyl ether and the ethereal solution extracted ten times with 40 ml. of water each time. In order to remove the last traces of cycloheptanol, the organic phase is evaporated to dryness under reduced pressure, the oily residue again dissolved in diethyl ether and the solution extracted ten times with 40 ml. of water each time. The combined water extracts are neutralised by the addition of 130 ml. of 5% sodium hydrogen carbonate solution. The precipitate of the free base is extracted with diethyl ether, the ethereal solution washed with water, dried over sodium sulphate and concentrated under reduced pressure. To the residual solution an excess of ethereal hydrochloric acid is added. The precipitated oily hydrochloride crystallises after triturating the oil repeatedly with fresh diethyl ether, decanting the diethyl ether each time.

In order to purify the crude hydrochloride, it is dissolved in 500 ml. of chloroform and a secondary product eliminated by the extraction of the chloroform solution four times with 30 ml. of water each time (control by thin-layer chromatography using the solvent system methylethyl ketone/pyridine/water (65:5:20); Rf of the hydrochloride: 0.92, Rf of the secondary product: 0.73). The chloroform solution is dried over sodium sulphate and concentrated under reduced pressure. Upon addition of diethyl ether to the remaining solution, the $N^6$-benzyloxycarbonyl-L-lysine cycloheptyl ester hydrochloride precipitates in the form of crystals. The product decomposes at 96–97°; $[\alpha]_D^{24°}$, +8.7° (c.=1.99 in ethanol); $[\alpha]_D^{24°}$, +8.6° (c.=2.00 in water).

EXAMPLE 2

(a) 155 ml. (1.71 mol) of cylopentanol are cooled to −10° and 12 ml. (0.165 mol) of thionyl chloride are added dropwise at −10° to −5°. 36.9 g. (0.15 mol) of $N^6$-isobutoxycarbonyl-L-lysine are then added in portions with stirring and the mixture is heated for 28 hours at 50°. The $N^6$-isobutoxycarbonyl-L-lysine dissolves during the reaction. To work up, the brownish reaction solution is concentrated under diminished pressure at 30°, the remaining brownish oil is dissolved in 150 ml. of cold water and the aqueous solution extracted twice with 100 ml. of diethyl ether each time. The pH of the aqueous phase is then adjusted to 8.5 with 2 N sodium hydroxide solution whereupon 4.2 g. of unchanged starting material precipitate. This is removed by filtration. The free base is extracted from the clear filtrate with ethyl acetate. The ethyl acetate solution is washed with a small amount of water, dried over sodium sulphate and concentrated in vacuo. The hydrochloride is precipitated by the addition of 110 ml. of 1.21 N ethereal hydrochloric acid and 400 ml. of diethyl ether at 0°. The crude hydrochloride is filtered and washed with diethyl ether.

The $N^6$-isobutoxycarbonyl-L-lysine cyclopentyl ester hydrochloride is completely purified by two recrystallisations from ethyl acetate. M.P. 95–96°; $[\alpha]_D^{22°}$, +4.7°

(c.=1.08 in 1 N hydrochloric acid); $[\alpha]_D^{22°}$ +5.6° (c.=2.06 in methanol).

The starting material, $N^6$-isobutoxycarbonyl-L-lysine, is obtained as follows:

(b) 80 g. (0.44 mol) of l-lysine hydrochloride are dissolved in 640 ml. of water, 80 g. of basic copper carbonate, $(2CuCO_3, Cu(OH)_2)$, are added and the reaction mixture is refluxed for 30 minutes. The excess copper carbonate is then removed by filtration. To the vigorously stirred deep blue filtrate, cooled to 0°, 120 g. (0.88 mol) of isobutyl chloroformate are added dropwise within 1 hour and the mixture stirred for 5 hours at 0°.

During the reaction the pH is maintained at 7.5–8.0 by the addition of solid sodium carbonate. The precipitated copper complex of $N^6$-isobutoxycarbonyl-L-lysine is collected on a filter, washed thoroughly with water and methanol and dried in vacuo.

91.0 g. of the copper complex are suspended in 1 litre of water and dissolved by the addition of 250 ml. of 6 N hydrochloric acid. A stream of hydrogen sulphide is then passed into the cooled solution for 45 minutes. The excess hydrogen sulphide is removed by a vigorous stream of air. The copper sulphide is filtered and washed with water. The pH of the colourless filtrate is adjusted to 6 with concentrated aqueous ammonia whereupon the crude product precipitates. After standing for 3 hours at 0° it is collected on a filter, washed well with water and ethanol and dried in vacuo. The $N^6$-isobutoxycarbonyl-L-lysine is crystallised from water/ethanol 1:1; M.P. 236–238° with decomposition, $[\alpha]_D^{23°}$, +17.6° (c.=2.04 in 1 N hydrochloric acid).

EXAMPLE 3

$N^6$-phenylacetyl-L-lysine cyclohexyl ester hydrochloride is produced analogously to Example 2(a) from $N^6$-phenylacetyl-L-lysine and cyclohexanol. M.P. 130–131° (from methanol/ethyl acetate/diethyl ester); $[\alpha]_D^{22°}$, +10.4° (c.=0.95 in methanol); $[\alpha]_D^{22°}$, +9.1° (c.=1.95 in water).

EXAMPLE 4

$N^6$-benzoyl-L-lysine cycloheptyl ester hydrochloride is produced analogously to Example 2(a) from $N^6$-benzoyl-L-lysine and cycloheptanol. It sinters at 95°, decomposes at 103–105° (from methanol/diethyl ether) and is hygroscopic; $[\alpha]_D^{22°}$, +9.5° (c.=1.79 in methanol); $[\alpha]_D^{22°}$, +14.5° (c.=1.79 in water).

EXAMPLE 5

(a) $N^6$-(p-chlorobenzoyl)-L-lysine cycloheptyl ester hydrochloride is obtained analogously to Example 2(a) from $N^6$-(p-chlorobenzoyl)-L-lysine and cycloheptanol; M.P. 68–71° (with decomposition) from methanol/water; it is hygroscopic; $[\alpha]_D^{23°}$, +8.5° (c.=2.09 in methanol); $[\alpha]_D^{22°}$, +3.1° (c.=2.17 in dimethyl formamide).

The starting material, $N^6$-(p-chlorobenzoyl)-L-lysine, is obtained as follows:

(b) 35.0 g. of basic copper carbonate, $(2CuCO_3, Cu(OH)_2)$ are added to 18.0 g. (0.1 mol) of L-lysine hydrochloride dissolved in 400 ml. of water. After refluxing the mixture for 2 hours, the excess copper carbonate is removed by filtration and washed with water. 26.2 g. (0.15 mol) of p-chlorobenzoyl chloride and 150 ml. of 2 N sodium hydroxide solution are added dropwise during 10 minutes to the vigorously stirred filtrate at 5°. The mixture is stirred for another hour at 20°. The precipitated copper complex is filtered and washed with water. To the still moist powder 330 ml. of 2 N hydrochloric acid are added and the stirred mixture is heated at 40° for 30 minutes, then cooled to 20° and filtered. A stream of hydrogen sulphide is passed into the filtrate for 30 minutes. The precipitated copper sulphide is filtered and washed with water. 6 N sodium hydroxide solution is added to the filtrate at 10° with stirring until the pH rises to 6. The $N^6$-(p-chlorobenzoyl)-L-lysine precipitates, is collected on a filter, washed with water, recrystallised from ethanol/water and dried in vacuo at 60°. It decomposes at 255–260°; $[\alpha]_D^{22°}$, +23.1° (c.=2.02 in formic acid.)

We claim:
1. A compound of the formula

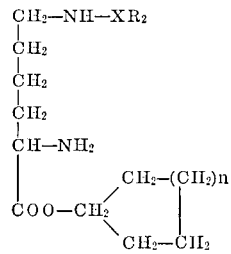

wherein
$XR_2$ is benzyloxycarbonyl, alkoxycarbonyl up to 12 carbon atoms, phenylacetyl, benzoyl or chlorobenzoyl; and
$n$ has a value of 1, 2 or 3.

2. The pharmaceutically acceptable acid addition salts of a compound according to claim 1.

3. A compound according to claim 1 where $XR_2$ is benzyloxycarbonyl or isobutoxycarbonyl.

4. A compound according to claim 3 where $XR_2$ is benzyloxycarbonyl and $n$ is 3.

5. A compound according to claim 3 where $XR_2$ is isobutoxycarbonyl and $n$ is 1.

6. A compound according to claim 1 where $XR_2$ is benzoyl, chlorobenzoyl or phenylacetyl.

7. A compound according to claim 1 where $XR_2$ is phenylacetyl and $n$ is 2.

8. A compound according to claim 6 where $XR_2$ is benzoyl and $n$ is 3.

9. A compound according to claim 6 where $XR_2$ is p-chlorobenzoyl and $n$ is 3.

References Cited

UNITED STATES PATENTS

| | | | |
|---|---|---|---|
| 2,839,574 | 6/1958 | Servigne et al. | 260—482 |
| 2,897,233 | 7/1959 | Kaiser | 260—482 XR |
| 3,264,279 | 8/1966 | Schwyzer et al. | 260—482 XR |
| 3,377,338 | 4/1968 | Panneman et al. | 260—482 XR |

OTHER REFERENCES

Shiba et al., Chemical Abstracts, vol. 55: 13, 329(e) (1961).

JAMES A. PATTEN, Primary Examiner

P. J. KILLOS, Assistant Examiner

U.S. Cl. X.R.

260—295, 307, 438.1, 479, 482, 501.15, 518, 534; 424—309, 311, 313